United States Patent [19]

Sullivan

[11] Patent Number: 4,514,015

[45] Date of Patent: Apr. 30, 1985

[54] BALL AND SOCKET LINKAGE AND BEARING ASSEMBLY

[76] Inventor: Jack W. Sullivan, 2236 Island Beach Rd., Oshkosh, Wis. 54901

[21] Appl. No.: 195,887

[22] Filed: Oct. 10, 1980

Related U.S. Application Data

[60] Continuation of Ser. No. 110,196, Jun. 7, 1980, abandoned, which is a continuation of Ser. No. 13,149, Feb. 21, 1979, abandoned, which is a division of Ser. No. 859,325, Dec. 12, 1977, Pat. No. 4,164,062.

[51] Int. Cl.$^3$ .................. F16C 17/10; F16C 19/10
[52] U.S. Cl. .................. 308/2 R; 384/207; 384/515; 384/615
[58] Field of Search .......... 308/193, 194, 189 R, 308/188, 219, 230, 233, 2 R; 403/76; 384/207, 208, 515, 615

[56] References Cited

U.S. PATENT DOCUMENTS

| | | | |
|---|---|---|---|
| 3,370,899 | 2/1968 | Eklund | 308/193 |
| 3,549,167 | 12/1970 | Haverback | 403/76 |
| 3,853,414 | 12/1974 | Hirano | 403/76 |

*Primary Examiner*—Lenard A. Footland
*Attorney, Agent, or Firm*—Bayard H. Michael

[57] ABSTRACT

In both the socket linkage and the ball bearing assembly the formed metal engages the curvature of the ball more than 90° which retains the parts in assembled relationship. The forming is accomplished by cupping metal into a die with clearance between the die and the punch less than the metal thickness to cold extrude the metal past the minimum clearance. In the case of the socket linkage the ball is used as the punch and the forming operation completes the assembly of the ball to the socket. Each race of the ball bearing assembly must be stripped from the curved forming part (die or punch) before final assembly with the balls. If the stripping operation deforms the metal past its elastic limit, the desired shape can be restored by use of a straight walled forming part before or after the races have been assembled with the balls between the races.

7 Claims, 15 Drawing Figures

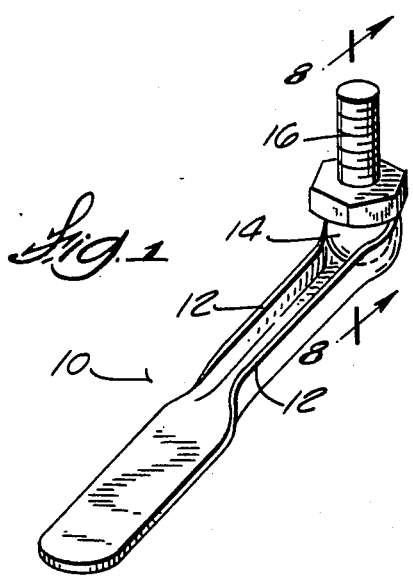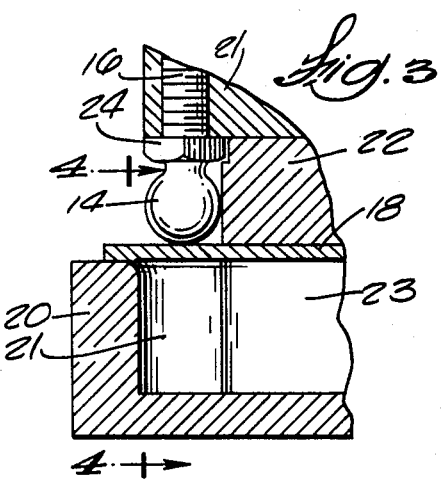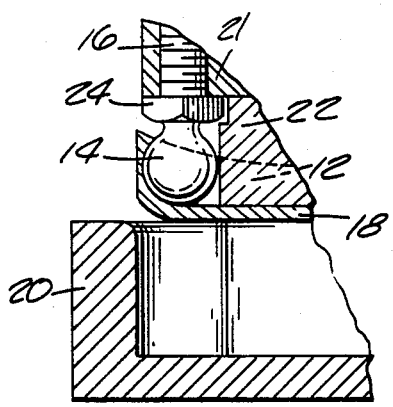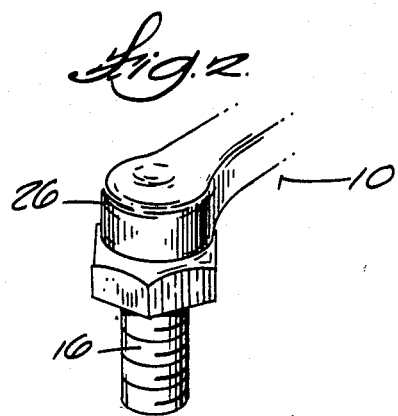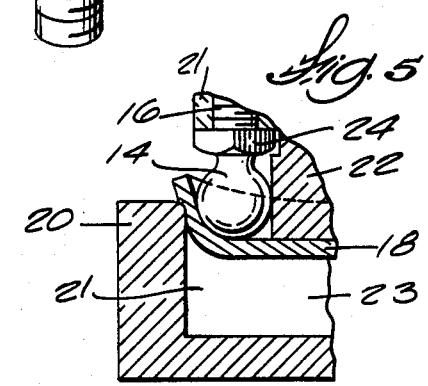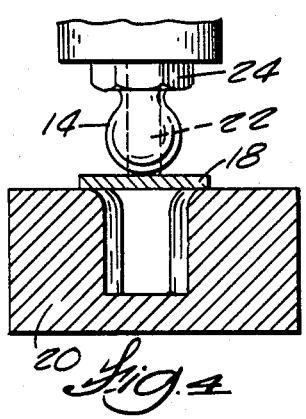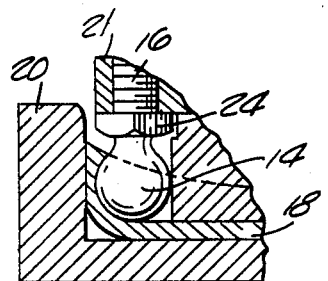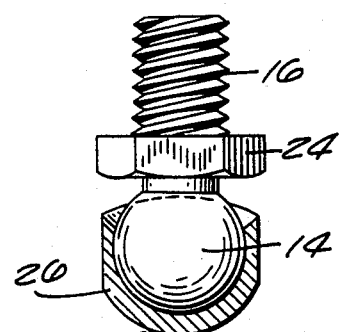

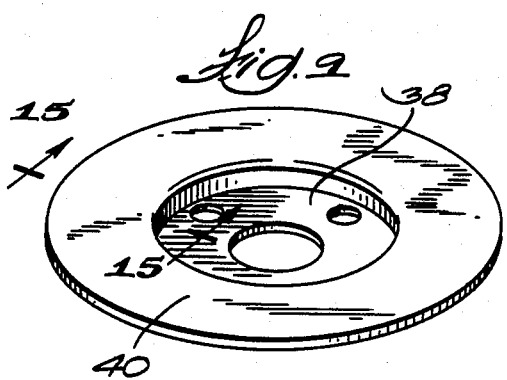
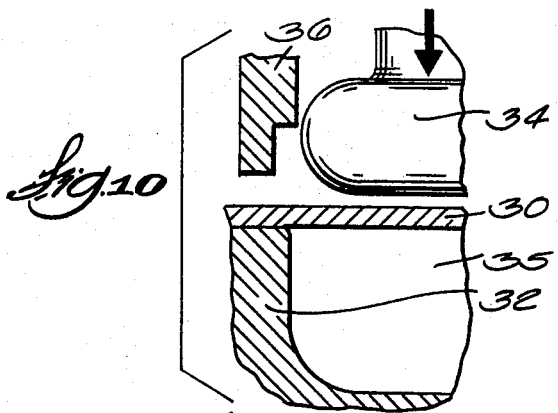
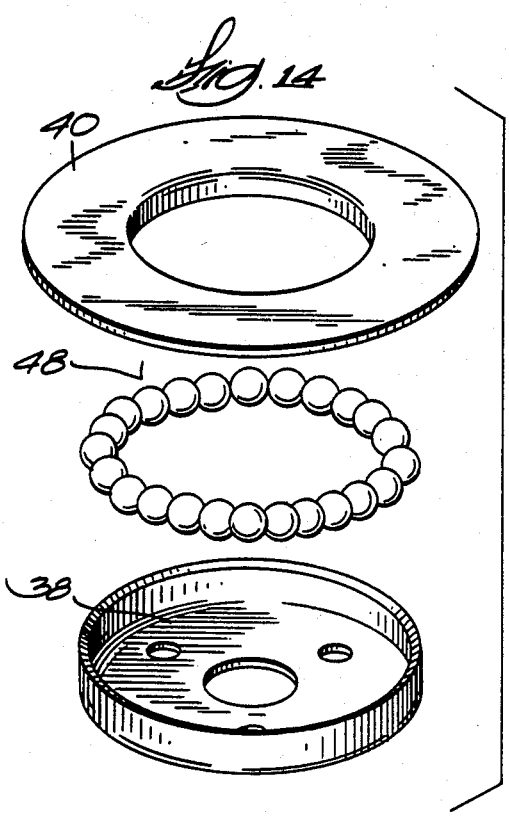
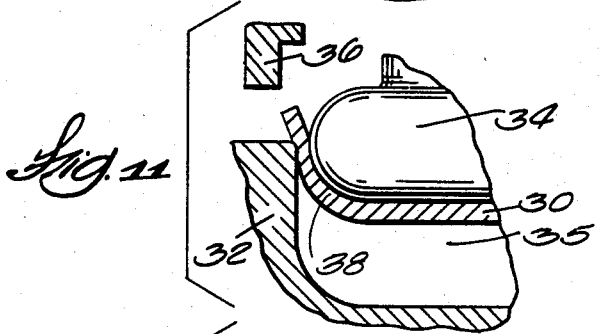
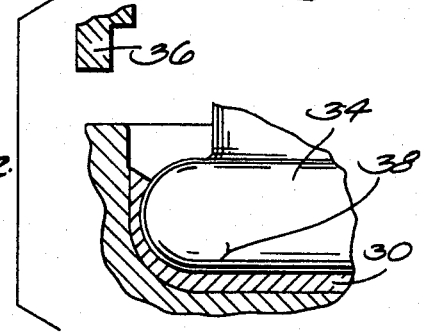
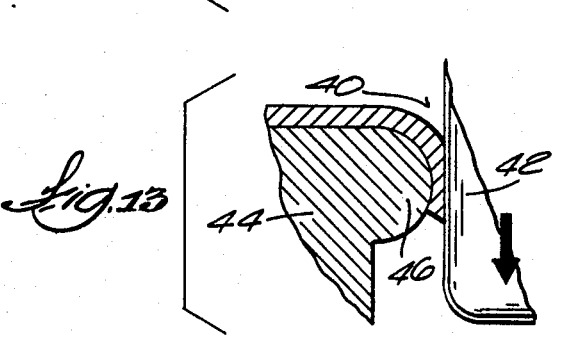
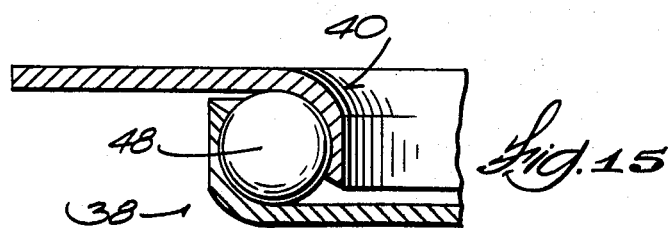

BALL AND SOCKET LINKAGE AND BEARING ASSEMBLY

CROSS REFERENCE TO RELATED APPLICATION

This application is a continuation of application Ser. No. 110,196 filed June 7, 1980, abandoned, as a continuation of application Ser. No. 013,149, abandoned, filed Feb. 21, 1979 as a division of application Ser. No. 859,325, filed Dec. 12, 1977, now U.S. Pat. No. 4,164,062 which is directed to the method of manufacturing the product claimed in this application.

BACKGROUND OF THE INVENTION

This invention relates to low cost radial ball bearings and socket linkages . . . heretofore not likely to have been considered as related subject matter. A recessed socket has generally been formed by mass coining around a hardened die which requires very high working forces. The forming operation was separate and distinct from assembly. Other arrangements utilized special couplers, etc., mounted in the linkage and connected to the ball. Ball bearings usually are provided as bearing assemblies to which are secured mounting plates, etc. Cost variations largely reflected the degree of precision of the bearings. There are some low priced "lazy Susan"-type bearings which are of little use in radial applications. Essentially, however, the only thing in common in the two devices is the desire for lower cost devices.

SUMMARY OF THE INVENTION

I have discovered a method of forming metal in a combination of cupping and cold extrusion which results in the formed metal embracing more than 90° of the curved surface over which it is formed. This is the feature common to both devices and the result leads to new designs of radial ball bearings and of (ball and) socket linkages. In the case of the socket linkage the ball which will be part of the final assembly is used as the punch to form metal in a die in which the punch and die clearance forces the metal to cold flow partially over the ball . . . enough so the ball is retained and the ball and socket assembly is completed in the formimg of the socket. In the broader sense the invention is applicable to formed parts having flat surfaces, the principal requirement being that the cross section gradually increases and then decreases.

The inner and outer races of the bearing assembly are similarly formed by squeezing forming tools together to cup and cold flow the metal over a toroid carried by one of the tools. The race is then stripped from the toroid by deflecting the inwardly formed metal over the toroid. The balls are then placed in the outer race and the inner race is pressed over the balls. If the stripping or pressing operation deforms the formed curved portion beyond its elastic limit the desired shape is simply restored by use of a straight walled tool before or after assembly. When completed the races are permanently assembled and the assembly is only the bare minimum of parts . . . the inner and outer races and the balls.

BRIEF DESCRIPTION OF THE DRAWINGS

FIG. 1 is a perspective view of an assembled socket linkage fabricated through use of the novel method.

FIG. 2 is another view of the socket linkage.

FIG. 3 shows the start of the forming action with the forming tool and the ball which serves as the punch positioned above the flat stock used at the start of the forming operation.

FIG. 4 is a section on line 4—4 in FIG. 3.

FIG. 5 is a view similar to FIG. 3 but part way through the forming stroke.

FIG. 6 shows the completion of the forming stroke.

FIG. 7 shows the position of the parts as they are withdrawn from the die.

FIG. 8 is a view taken on line 8—8 in FIG. 1 showing the assembled ball and socket.

FIG. 9 is a perspective view of a finished radial ball bearing assembly.

FIG. 10 shows the start of the forming operation used to make the outside race out of sheet stock.

FIG. 11 shows the point in the forming stroke where cold extrusion starts.

FIG. 12 illustrates the conclusion of the forming operation initiated in FIG. 10.

FIG. 13 illustrates the forming operation employed in fabricating the inside race.

FIG. 14 is an exploded perspective view of the parts in their relative positions prior to assembly.

FIG. 15 is a section taken on line 15—15 of FIG. 9 showing a section through the completed assembly.

DETAILED DESCRIPTION OF THE DRAWINGS

FIGS. 1 and 2 show a typical completed ball and socket linkage end made according to the novel method described hereafter and resulting in a novel assembly. The requirement for ball and socket arrangements on the end of a link is quite customary in many applications. As will be apparent, the present invention could be utilized in making the ball and socket connection along the length of the link as well as at the end. Indeed it need not be a ball and socket arrangement but could be utilized for forming the link about any other type of head to provide for more limited alignment or no alignment. For example, a cylindrically headed stud could be connected to the link to allow alignment in only one plane.

It will be noted that the end of the link 10 has upwardly formed sides 12 and the distal end of the link has been formed over ball 14 to capture the ball while permitting the threaded stud 16 to be moved relative to the linkage within a limited range of angular motion. The material of the link forms the socket and also captures the ball.

This construction is made in a novel way as shown in FIGS. 3-7. A piece of flat metal 18 is positioned above the die 20. The threaded ball stud having ball 14 and threaded shaft 16 is mounted in a tool 20 as shown in FIG. 3 and then a vertically oriented punch 22 is moved in to abut the ball 14 and engage the shoulder of the hex head 24 to retain the ball in the corresponding socket for threaded stud 16. The ball need not be threaded into the tool since it will be retained by the punch 22. The portion 21 of the die cavity underlying the ball has a circular configuration in plan view. The portion 23 underlying punch 22 is used in forming sides 12. Provision of threads and the shoulder are optional and dictated by the ultimate use.

As the tool 20 is moved down, forming the metal 18 is started with a cupping operation. The metal forms around ball 14 and the punch 22 as seen in FIG. 5. Before the maximum diameter of the ball enters the die 20 (FIG. 5) a cold extrusion is initiated because the clearance between the ball and the interior of the die 20 is less than the thickness of the metal 18. Thus, as the cupping operation continues, there is cold extrusion of the metal past the maximum diameter of the ball and it flows back in over the ball (as may be seen in FIG. 6) until the maximum diameter passes the first part of the smallest diameter of the die. Thus, the ball is captured and the ball which has been used as a punch is now permanently assembled to the metal of the socket. The forming operation comprising the cupping and cold extrusion has not only formed the socket but it has assembled the ball to the socket. When the tool 20 is withdrawn to the position shown in FIG. 7, the vertical straight sided punch 22 can now be removed which will in turn permit removal of the threaded stud having the ball head and the operation is complete. FIG. 8 shows a view throught the ball and socket connection at right angles to the axis of the link. It will be clear that the ball is captured by the socket and yet the threaded stud can be moved through a reasonable range of angular motion making the product well suited to many linkage applications. A novel aspect of this operation is that the ball headed threaded stud 16 is used as a punch and at completion of the operation is assembled to the linkage. Thus, the ball is used as a "one-shot" punch and the forming operation completes the assembly operation. It will be appreciated that the straight sided punching tool 22 is used over and over again and is used to give the channel formation to the end of the link. Tool 22 should be hardened, therefore, but the ball need not be.

As can be seen in FIG. 2, the forming operation results in what may be termed a highly polished surface 26 where the cold extrusion takes place. This is occasioned by the cold extrusion process. The pressure involved in this operation is considerably lower than the pressure involved in the usual coining methods used in fabricating sockets. In those coining operations it is necessary to use hardened steel tools and in the present arrangement the ball need not be hardened since the pressures are not that extreme. Furthermore, variations in dimensions of the ball from piece to piece are not of great significance since the link will in effect be formed over the ball within a relatively wide tolerance range. All that is necessary is that the clearance between the ball punch and the die be less than the thickness of the material and, therefore, result in the cold extrusion over the ball.

The radial ball bearing assembly shown in FIGS. 9–15 is simplicity in itself and permits not only novel fabrication of the inner and outer races but permits provision of a wide variety of inside or outside plates integral with the races for adaptation to various installations. It will be noted the assembly consists only of the inside and outside races and the balls between the races. The parts are held in assembled positions by the interference of the balls with the inside and outside races.

In FIGS. 10–12 the formation of the outside race is illustrated. Here the flat sheet stock 30 is positioned above the die 32. A toroidal punch 34 is now moved downwardly into die cavity 35. The clearance between the maximum diameter of the toroid and the inside wall of the die is less than the thickness of the metal 30. Therefore, as the die moves down, the metal is first cupped (FIG. 11) and then cold extruded around the toroid 34 (FIG. 12). FIG. 12 illustrates the end of the forming operation. Now as the toroidal punch is withdrawn, the stripping tool 36 in FIG. 8 will engage the outer race 38 and strip it from the toroid. In order to do this, the race must be sprung a little to get over the maximum diameter of the toroid. If the deflection is within the elastic limit of the metal, the race will return to its previously formed shape. If it exceeds the elastic limit, it will have to be reformed as discussed hereafter.

FIG. 13 illustrates the formation of the inside race 40. Here a smooth sided punch 42 is moved into the die 44 having the toroidal interior protrusion 46. Again, the clearance between the punch and the die is less than the thickness of the metal being formed and, therefore, the metal is forced to cold extrude past the point of maximum diameter as shown clearly in FIG. 13. After the punch 42 is removed, a separate stripping tool is necessary to remove the inside race 40 from the toroid 46. Here again, this may or may not permanently deflect the material as it deflects over the toroid.

Each race has now been formed with an interior curvature which extends far enough to engage more than 90° of a ball in the race. To assemble the bearing the balls 48 are placed in the outside race 38 and the inside race is then pressed down over the balls until it snaps into place with the balls captured between the races. The races are retained in assembled position by reason of fact that each ball engages more than 90° of each ball. The balls have an interference fit with the races and this holds the parts assembled. Thus, the finished product can withstand some axial force tending to separate the races.

Pressing the inside race down over the outside balls runs the risk of deformation of either or both races past the elastic limit and this would of course have an adverse effect on the final assembly. Similarly, the deformation which could occur during the stripping operations in forming the two races can permanently deflect the lip of the race. It is a simple matter to reform the races either before or after assembly of the races and the balls. To reform the outside race, a sleeve-like forming tool is passed over the outside of the race to press the sides inwardly. In the case of the inside race, it is simply necessary to pass a cylindrical forming tool (comparable to punch 42) inside the inside race to press the lip of the race outwardly into its desired position. This reforming operation can be done either before or after assembly or both before and after assembly.

The finished product consists of the bare essentials of a radial ball bearing assembly . . . inside and outside races and the balls between the races. Due to the nature of the forming operation, the races can include additional metal which can be used in mounting the assembly.

This bearing assembly does not comprise a precision ball bearing assembly but it provides a radial ball bearing assembly which can be utilized in many industrial applications and can be fabricated at substantially less cost than any other construction.

It is to be noted that in forming either race and in forming the socket, the formed part is secured to the tool over which it has been formed. In the case of the ball and socket construction, this completes the fabrication while in the case of both races the race must be removed from the tool. If the ball and socket configuration with its attendant allowance for motion is not required the "tool" may have flat surfaces and achieve the cold extrusion.

I claim:
1. An assembly comprising,
 inner metallic means having an axis and having outwardly facing curved metal contact surfaces con- strained against axial movement by a unitary structure, an outer metallic member having an integral inwardly facing curved metal surface mating with said contact surfaces more than 90° as measured in a plane including said axis, the curved surface of said outer member engaging said contact surfaces for more than 180° as measured about said axis, said outer member including a flat portion integral with the curved surface and lying in a plane normal to said axis and extending inwardly from said inwardly facing curved metal surface past the center of curvature of said contact surfaces, said inner means including an integral continuous metallic inner race and a multiplicity of balls between said race and the outer member, each of the balls having an outwardly facing contact surface mating with the curved surface of the outer member, said inner race being said unitary structure and embracing more than 90° of each ball as measured in a plane including said axis and having an integral flat portion parallel to the first named flat portion and extending from the curved surface of the inner race past the center of the balls, the integral curved metal surface of the outer member being a continuous outer race, neither of the races being split.

2. An assembly comprising an outer metallic member having a flat portion with an integral continuous outer race extending therefrom, an inner metallic member having a flat portion and an integral continuous inner race extending therefrom, a plurality of balls between said race, neither race being split, each race engaging the portion of the surface of the balls which is on the other side of a plane including the centers of all the balls opposite the flat portion of the member associated with the race whereby axial separation of the members is precluded, each race being sufficiently flexible to deflect radially to pass the balls during assembly by pressing the inner race inside the outer race with the balls therebetween, the flat portion of the outer member being parallel to said plane and extending inwardly from the curved race surface of the outer race past the inner race and the flat portion of the inner member being parallel to said plane and extending outwardly from the curved race surface of the inner race past the outer race.

3. A device comprising, an inner assembly presenting outwardly facing curved surfaces, a unitary outer assembly having an integral continuous formed metal portion extending over said curved surfaces and having an inner curvature corresponding to and mating with said curved surfaces, said inner and outer assemblies having a common axis about which the assemblies are relatively rotatable, the thickness of said formed metal portion being reduced in the region of maximum distance of the curved surfaces from said axis and the formed metal portion extending beyond the reduced region so the formed portion grips the curved surfaces, the outer assembly including a flat portion normal to said axis extending inwardly from said inner curvature past the center of curvature of said outwardly facing curved surfaces.

4. A two-piece ball and socket assembly comprising, a metal ball, an integral metal member having an integral portion formed therefrom over the ball, the formed metal portion having enough strength and embracing enough surface of the ball to prevent separation, the portion of the metal member embracing the ball being continuous without any splits or slots.

5. An assembly according to claim 4 in which the formed portion extends past the medial plane of the ball and embraces more than 180° but less than 360° of the ball in a plane parallel to said medial plane.

6. A bearing assembly comprising, an inner metal race, an outer metal race, ball bearings captured between the races, neither of the races being split and both of the races being sufficiently flexible to deflect during assembly to pass over the ball bearings while axially pressing the inner race inside the outer race.

7. In a bearing assembly having an inner race and an outer race and a plurality of balls between the races, the improvement being that both the inner and outer races are continuous unitary metal members each formed to engage said balls on each side of a plane through the centers of the balls whereby the races and balls cannot be separated, each race having an integral flat portion parallel to said plane, the flat portion of the outer member extending inwardly from the curved race surface of the outer race past the inside of the inner race and the flat portion of the inner member extending outwardly from the curved race surface of the inner race past the outside of the outer race.

* * * * *